US012696344B2

(12) United States Patent
Li et al.

(10) Patent No.: US 12,696,344 B2
(45) Date of Patent: Jul. 28, 2026

(54) DRX PACKET WAKE-UP METHOD AND APPARATUS, COMMUNICATION DEVICE, AND STORAGE MEDIUM

(71) Applicant: Beijing Xiaomi Mobile Software Co., Ltd., Beijing (CN)

(72) Inventors: Yanhua Li, Beijing (CN); Xiaowei Jiang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 434 days.

(21) Appl. No.: 18/025,801

(22) PCT Filed: Sep. 11, 2020

(86) PCT No.: PCT/CN2020/114888
§ 371 (c)(1),
(2) Date: Mar. 10, 2023

(87) PCT Pub. No.: WO2022/052062
PCT Pub. Date: Mar. 17, 2022

(65) Prior Publication Data
US 2023/0209645 A1    Jun. 29, 2023

(51) Int. Cl.
*H04W 76/28*    (2018.01)
*H04W 28/06*    (2009.01)

(52) U.S. Cl.
CPC .......... *H04W 76/28* (2018.02); *H04W 28/065* (2013.01)

(58) Field of Classification Search
CPC ............. H04W 76/28; H04W 52/0235; H04W 28/065; Y02D 30/70
See application file for complete search history.

(56) References Cited

U.S. PATENT DOCUMENTS

| | | | | |
|---|---|---|---|---|
| 11,595,980 B2 * | 2/2023 | Seo | ................... | H04W 52/0216 |
| 12,047,964 B2 * | 7/2024 | Nam | ....................... | H04L 5/001 |
| 2015/0003312 A1 * | 1/2015 | Jeong | ................ | H04W 52/0216 370/311 |
| 2015/0057033 A1 | 2/2015 | Schliwa-Bertling et al. | | |
| 2016/0338143 A1 | 11/2016 | Johansson et al. | | |
| 2017/0208523 A1 | 7/2017 | Yang et al. | | |
| 2018/0132292 A1 | 5/2018 | Yang et al. | | |
| 2020/0037247 A1 * | 1/2020 | Liao | ................... | H04W 52/0216 |
| 2020/0045768 A1 * | 2/2020 | He | ......................... | H04W 76/28 |
| 2020/0145921 A1 | 5/2020 | Zhang et al. | | |
| 2020/0267655 A1 * | 8/2020 | Awoniyi-Oteri | ............................ | H04W 52/0216 |
| 2021/0243690 A1 * | 8/2021 | He | ......................... | H04W 72/20 |

(Continued)

FOREIGN PATENT DOCUMENTS

| | | |
|---|---|---|
| CN | 104640216 A | 5/2015 |
| CN | 110198557 A | 9/2019 |

(Continued)

OTHER PUBLICATIONS

CN 110831123 B (Year: 2018).*

(Continued)

*Primary Examiner* — Nizar N Sivji
(74) *Attorney, Agent, or Firm* — Volpe Koenig

(57)    ABSTRACT

A DRX packet wake-up method includes: sending a wake-up notification to a first DRX packet in a wake-up state in a UE, said wake-up notification being at least used for early wake-up a second DRX packet in a sleep state in said UE.

18 Claims, 6 Drawing Sheets

```
┌──────────────┐              ┌──────────────┐
│ Base station │              │      UE      │
└──────────────┘              └──────────────┘
       │                             │
       │                             │
  S110: transmit a wake-up notification to a first
     discontinuous reception (DRX) group in a
       │──────────────────────────▶│
  wake-up state in user equipment (UE), where
  the wake-up notification is at least configured
  to wake up a second DRX group in a dormant
           state in the UE in advance
```

(56)                    References Cited

U.S. PATENT DOCUMENTS

| | | | | |
|---|---|---|---|---|
| 2021/0282160 A1 * | 9/2021 | Kaikkonen | ......... | H04W 72/121 |
| 2022/0183101 A1 * | 6/2022 | Jang | ...................... | H04L 5/0057 |
| 2022/0330378 A1 * | 10/2022 | Seo | ...................... | H04W 76/28 |
| 2023/0403757 A1 * | 12/2023 | Kong | ................... | H04W 76/27 |
| 2024/0023023 A1 * | 1/2024 | Tsai | ................. | H04W 52/0235 |

FOREIGN PATENT DOCUMENTS

| | | | | |
|---|---|---|---|---|
| CN | 110520840 A | 11/2019 | | |
| CN | 110546999 A | 12/2019 | | |
| CN | 110831123 A | 2/2020 | | |
| CN | 111034247 A | 4/2020 | | |
| CN | 111294902 A | 6/2020 | | |
| EP | 3669610 B1 * | 10/2021 | ............. | H04L 5/008 |
| EP | 3944656 A1 * | 1/2022 | ............. | H04W 76/28 |
| EP | 3821678 B1 * | 3/2023 | ........... | H04L 1/1812 |
| JP | 2015-177283 A | 10/2015 | | |
| WO | WO-2017119729 A1 * | 7/2017 | ........ | H04W 52/0251 |

OTHER PUBLICATIONS

Chinese Office Action issued on Jan. 30, 2024 for Chinese Patent Application No. 2020800022502.

CATT, R1-1810563 "UE Power saving schemes with power saving signal/channel/procedures" (2018).

Qualcomm Incorporated, R1-1711187 "Advanced Grant Indication for UE Power Saving" (2017).

Qualcomm Incorporated et al., R2-1709652 "Wake-up signaling for C-DRX mode" (2017).

Chinese Office Action dated May 16, 2023 for Chinese Patent Application No. 202080002250.2.

"R2-1800332—DRX with short on-duration and Wake-up signaling", Ericsson, 33GPP TSG-RAN WG2 #AH NR 1801 Vancouver, Canada, Jan. 22-26, 2018; R2-1800332; Revision of R2-1713468. 3 pgs.

* cited by examiner

| Base station | | UE |
|---|---|---|

S110: transmit a wake-up notification to a first
discontinuous reception (DRX) group in a
wake-up state in user equipment (UE), where
the wake-up notification is at least configured
to wake up a second DRX group in a dormant
state in the UE in advance

| Base station | | UE |
|---|---|---|

S210: receive, using a first DRX group in a wake-up state, a wake-up notification for a second DRX group S220: wake up the second DRX group in advance according to the wake-up notification Apparatus for wake-up for DRX First transmission module 510

DRX PACKET WAKE-UP METHOD AND APPARATUS, COMMUNICATION DEVICE, AND STORAGE MEDIUM

CROSS-REFERENCE TO RELATED APPLICATION

The present application is a U.S. National Stage of International Application No. PCT/CN2020/114888, filed on Sep. 11, 2020, the contents of all of which are incorporated herein by reference in their entirety for all purposes.

BACKGROUND

In order to satisfy requirements for an increase in single-user peak rate and system capacity, carrier aggregation (CA) has been introduced into Release (R10) of long-term evolution (LTE).

SUMMARY

Examples of the disclosure provide a method for wake-up for discontinuous reception (DRX), a communication device, and a storage medium.

A first aspect of the examples of the disclosure provides a method for wake-up for DRX. The method includes:

transmitting a wake-up notification to a first DRX group in a wake-up state in a user equipment (UE), where the wake-up notification is at least configured to wake up a second DRX group in a dormant state in the UE in advance.

A second aspect of the examples of the disclosure provides a method for wake-up for DRX. The method includes:

receiving, using a first DRX group in a wake-up state, a wake-up notification for a second DRX group; and waking up the second DRX group in advance according to the wake-up notification.

A third aspect of the examples of the disclosure provides a communication device. The communication device includes: a transceiver, a memory that stores an executable program, one or more processors that are communicatively coupled to the transceiver and the memory, where the executable program, when collectively executed by the one or processors, cause the communication device to perform the method shown in any one of technical solutions according to the first aspect or the second aspect.

A fourth aspect of the examples of the disclosure provides a non-transitory computer storage medium. The non-transitory computer storage medium stores an executable program, where the executable program, when executed by a processor of a communication device, causes the communication device to perform the method shown in any one of technical solutions of the first aspect or the second aspect.

It is to be understood that the above general description and the following detailed description are merely illustrative and explanatory, and cannot limit the examples of the disclosure.

BRIEF DESCRIPTION OF THE DRAWINGS

The drawings here are incorporated into the description as a constituent part of the description, illustrate examples conforming to the disclosure, and serve to explain principles of the examples of the disclosure along with the description.

DETAILED DESCRIPTION

The disclosure relates to, but is not limited to, the technical field of radio communication, and particularly relates to a method and apparatus for wake-up for discontinuous reception (DRX), a communication device, and a storage medium.

In order to satisfy requirements for an increase in single-user peak rate and system capacity, carrier aggregation (CA) has been introduced into Release 10 of long-term evolution (LTE). It can be divided into continuous carrier aggregation and discontinuous carrier aggregation. For continuous carrier aggregation, a terminal merely needs a transceiver, and for different bands of discontinuous carrier aggregation, different transceivers (or radio frequency (RF) chains) are needed. Thus, it is extremely likely that a primary cell (PCell) and a secondary cell (SCell) use different RF chains; accordingly, the RF chains used by the PCell and the SCell can be switched on or off separately, and the PCell and the SCell can be set to different discontinuous reception (DRX) groups.

Examples will be described in detail here and shown in the accompanying drawings illustratively. When the following descriptions involve the accompanying drawings, unless otherwise specified, the same numeral in different accompanying drawings denotes the same or similar element. The implementations described in the following examples do not denote all implementations consistent with the examples of the disclosure. On the contrary, the implementations are merely examples of an apparatus and a method consistent with some aspects of the examples of the disclosure as detailed in the appended claims.

The terms used in the examples of the disclosure are merely to describe the specific examples, instead of limiting the examples of the disclosure. The singular forms such as "a", "an", and "this" used in the examples of the disclosure and the appended claims are also intended to include the plural forms, unless otherwise clearly stated in the context. It is further to be understood that the term "and/or" used here refers to and includes any of one or more of the associated listed items or all possible combinations.

It is to be understood that although the terms such as first, second, and third may be used to describe various information in the examples of the disclosure, the information is not intended to be limited to the terms. The terms are merely used to distinguish the same type of information from each other. For example, without departing from the scope of the examples of the disclosure, first information can also be called second information, and similarly, the second information can also be called the first information. Depending on the context, the word "if" used here can be interpreted as "when" or "while", or "in response to determining".

Figures 1, 2:
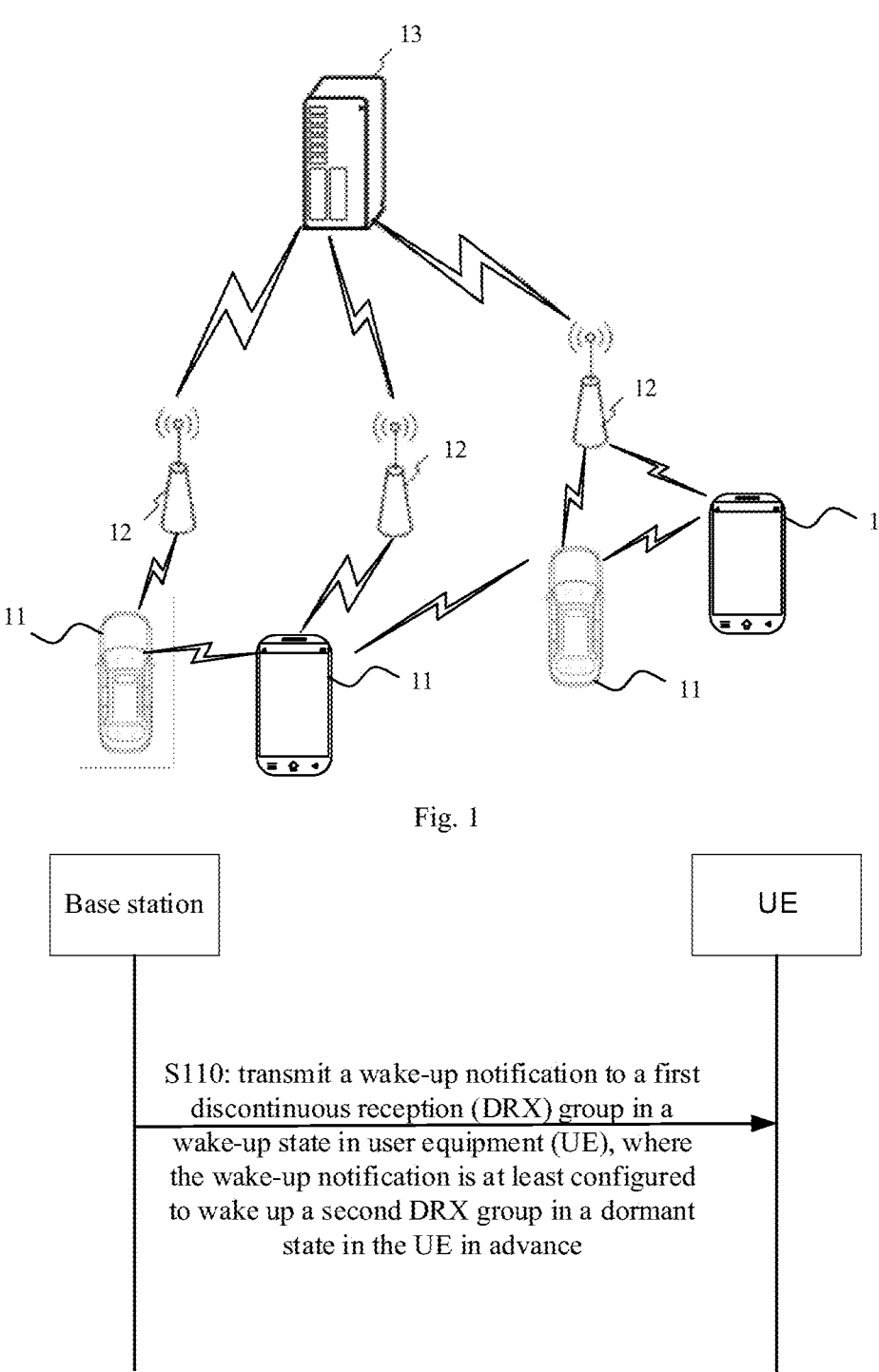
FIG. 1 is a schematic structural diagram of a radio communication system according to an example.
FIG. 2 is a schematic flow diagram of a method for wake-up for discontinuous reception (DRX) according to an example.

With reference to FIG. 1, a schematic structural diagram of a radio communication system provided in an example of the disclosure is shown. As shown in FIG. 1, the radio communication system is a communication system based on a cellular mobile communication technology. The radio communication system may include: a plurality of user equipments (UEs) 11 and a plurality of base stations 12.

The UE 11 may refer to a device that provides voice and/or data connectivity for a user. The UE 11 may be in communication with one or more core networks via a radio access network (RAN). The UE 11 may be an Internet of Things UE, such as a sensor device, a mobile telephone (also called a cellular telephone), or a computer having the Internet of Things UE, for example, a fixed, portable, pocket, hand-held, built-in, or vehicular apparatus. The UE may be a station (STA), a subscriber unit, a subscriber station, a mobile station, a mobile, a remote station, an access point, a remote terminal, an access terminal, a user terminal, a user agent, a user device, or UE. Alternatively, the UE 11 may also be a device of an unmanned aerial vehicle. Alternatively, the UE 11 may also be a vehicular device, for example, a vehicle computer having a radio communication function, or a radio communication device connected to the vehicle computer. Alternatively, the UE 11 may also be a roadside device, for example, a street lamp having a radio communication function, a signal lamp, or other roadside devices.

The base station 12 may be a network-side device in the radio communication system. The radio communication system may be a 4th generation mobile communication (4G) system, which is also called a long-term evolution (LTE) system; alternatively, the radio communication system may also be a 5th generation mobile communication (5G) system, which is also called a new radio (NR) system or a 5G NR system. Alternatively, the radio communication system may also be a next-generation system of the 5G system. An access network in the 5G system may be called a new generation radio access network (NG-RAN), or the access network in the 5G system may be called a machine type communication (MTC) system.

The base station 12 may be an evolved Node B (eNB) used in the 4G system. Alternatively, the base station 12 may also be a generation Node B (gNB) with a central and distributed framework used in the 5G system. When using the central and distributed framework, the base station 12 usually includes a central unit (CU) and at least two distributed units (DUs). The central unit is provided with protocol stacks of a packet data convergence protocol (PDCP) layer, a radio link control (RLC) layer, and a media access control (MAC) layer, and the distributed unit is provided with a protocol stack of a physical (PHY) layer. A specific implementation form of the base station 12 is not limited to the examples of the disclosure.

The base station 12 may be in radio connection with the UE 11 by using radio. In different implementations, the radio is based on a 4th generation mobile communication (4G) standard; alternatively, the radio is based on a 5th generation mobile communication (5G) standard, such as new radio; and alternatively, the radio may also be based on a next-generation mobile communication network technology standard of 5G.

In some examples, an end-to-end (E2E) connection may be further established between UEs 11, for example, vehicle-to-vehicle (V2V) communication, vehicle-to-infrastructure (V2I) communication, and vehicle-to-pedestrian (V2P) communication in vehicle-to-everything (V2X).

In some examples, the radio communication system may further include a network management device 13.

Several base stations 12 are connected to the network management device 13 separately. The network management device 13 may be a core network device in the radio communication system. For example, the network management device 13 may be a mobility management entity (MME) in an evolved packet core (EPC). Alternatively, the network management device may also be a serving gateway (SGW), a public data network gateway (PGW), a policy and charging rules function (PCRF), a home subscriber server (HSS), or other core network devices. An implementation form of the network management device 13 is not limited to the examples of the disclosure.

As shown in FIG. 2, a method for wake-up for discontinuous reception (DRX) includes the following step S110.

In step S110, a wake-up notification is transmitted to a first DRX group in a wake-up state in the UE, where the wake-up notification is at least configured to wake up a second DRX group in a dormant state in the UE in advance.

The method for wake-up for DRX provided in an example of the disclosure may be applied to a base station. Generally, when to wake up one or more DRX groups in the UE may depend on a DRX cycle itself or timeout of an inactivity timer. In this case, the first DRX group and the second DRX group may be different DRX groups in the UE.

In the example of the disclosure, a mode is further introduced as follows: a base station may transmit a wake-up notification, the wake-up notification is capable of waking up a DRX group in a dormant state in advance, that is, UE is woken up before a wake-up time of a DRX cycle (for example, a start time of on-duration) or timeout of an inactivity timer. Alternatively, in response to determining that no inactivity timer is set initially, a DRX group in a dormant state in the UE is woken up before a start time of the on-duration of a DRX cycle by setting an inactivity timer.

For example, the base station may determine whether to transmit the wake-up notification according to a cache data volume for the UE. For example, in response to determining that the cache data volume for the UE is greater than a cache threshold, it is determined that the wake-up notification needs to be transmitted, and a second DRX group in the UE is triggered to be woken up in advance. In response to determining that a cache data volume for the UE is smaller than or equal to a cache threshold, it is determined that the wake-up notification does not need to be transmitted to wake up a second DRX group in advance.

Time during which a DRX group is in a wake-up state may be called wake-up time, and the wake-up time may also be called activation time. Time during which a DRX group is in a dormant state may be called dormancy time. The dormancy time may also be called sleep time or inactivation time.

In a word, power consumption of the DRX group in the wake-up state is higher than that of the DRX group in the dormant state. In the wake-up state, the DRX group may monitor downlink channels such as a physical downlink control channel (PDCCH), but in the dormant state, the DRX group cannot monitor downlink channels such as a PDCCH.

In this way, by using the wake-up notification, the UE may wake up a required DRX group in time, such that phenomena of low data transmission efficiency caused by a dormant state of a corresponding DRX group are reduced, and data transmission delays are reduced. In addition, through the introduction of the wake-up notification, the base station may change the state of the DRX group in the UE more flexibly.

In the example of the disclosure, a first DRX group and the second DRX group may be a DRX group of a primary cell and a DRX group of a secondary cell, respectively.

For example, the first DRX group may be the DRX group of the primary cell, and the second DRX group may be the DRX group of the secondary cell. For another example, the second DRX group may be the DRX group of the primary cell, and the first DRX group may be the DRX group of the secondary cell.

In a word, the first DRX group is different from the second DRX group. The first DRX group may be a DRX group currently in the wake-up state, and the second DRX group may be a DRX group currently in the dormant state.

The first DRX group is in the wake-up state and is capable of receiving any information, such that a wake-up notification for the second DRX group may be transmitted to the first DRX group, the first DRX group receives the wake-up notification and then reports the wake-up notification to a central processing unit (CPU) or an access point (AP), and the CPU or the AP may wake up the second DRX group in advance according to the wake-up notification.

In an example, the wake-up notification may at least carry a group identifier of a DRX group to be woken up. After receiving the wake-up notification, the UE may determine a DRX group targeted by the wake-up notification.

In another example, the wake-up notification may further include: a group identifier of a DRX group that receives the wake-up notification, such that the first DRX group of the UE determines whether the first DRX group needs to receive and process the wake-up notification after receiving the wake-up notification.

In another example, the wake-up notification may not include a group identifier of the first DRX group, and the base station may transmit the wake-up notification carrying a group identifier of the second DRX group on a time frequency resource scheduled for the first DRX group, such that the first DRX group may naturally receive the wake-up notification for the second DRX group.

In some examples, the wake-up notification is configured to instruct an inactivity timer (IAT) of the second DRX group to start or restart.

The contents of the wake-up notification may be composed of any one of various types, which include:

one or more bits instructing the UE to wake up the second DRX group in the dormant state in advance. The UE may decide which way to wake up the second DRX group in advance by itself. For example, the UE may determine which way to wake up the second DRX group in advance according to a current dormant state of the second DRX group and/or power consumption of the second DRX group.

One or more bits instruct the UE to directly wake up the second DRX group in the dormant state when the UE receives the wake-up notification.

One or more bits instruct the UE to set an inactivity timer for waking up the second DRX group in advance when the UE receives the wake-up notification. Within a timing range of the inactivity timer, the second DRX group of the UE is kept in the wake-up state. In this way, the second DRX group of the UE enters the wake-up state at a start time when the inactivity timer starts initially or restarts. A timing start time of the IAT may be a reception time of the wake-up notification, a predetermined time after receiving the wake-up notification, or a start time indicated by the wake-up notification.

Figures 3, 4:
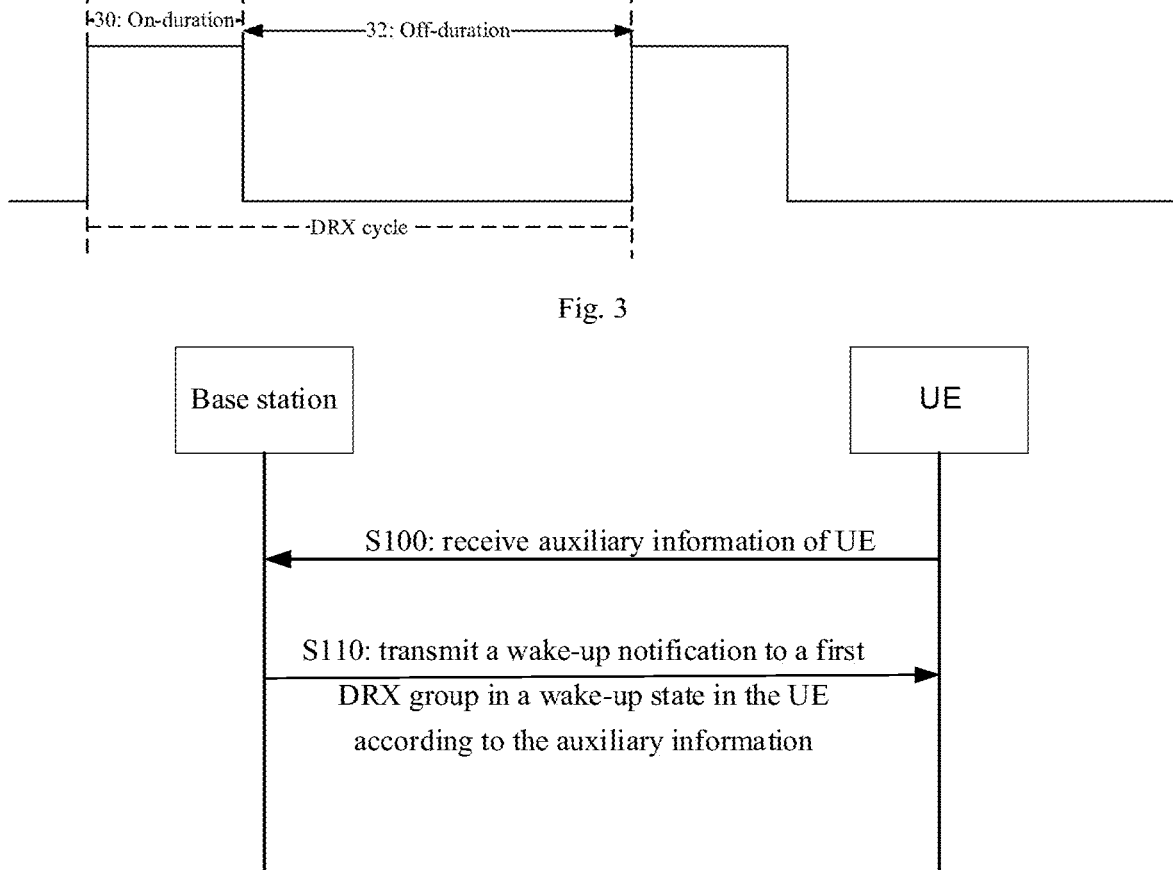
FIG. 3 is a schematic diagram of a DRX cycle according to an example.
FIG. 4 is a schematic flow diagram of a method for wake-up for the DRX according to an example.

One or more bits instruct the UE to switch the second DRX group from running according to a long DRX cycle to running according to a short DRX cycle when the UE receives the wake-up notification. The short DRX cycle is shorter than the long DRX cycle. Off-duration 32 of the long DRX cycle, as shown in FIG. 3, is longer than that of the short DRX cycle. In this way, types of DRX cycles are switched, the duration during which the second DRX group is kept in the dormant state is combined, and the second DRX group may inevitably end sleep in advance.

One or more bits instruct the UE to deactivate a DRX function in advance after the UE receives the wake-up notification and before the end of the current dormant state of the second DRX group, and then the second DRX group may exit switch between a dormant state and a wake-up state according to a DRX cycle and keep the wake-up state, which is equivalent to waking up the second DRX group in advance. For example, one or more indicator bits of the wake-up notification are configured to instruct the UE to immediately deactivate a DRX function of the second DRX group after the UE receives the wake-up notification. Due to a deactivation function of the second DRX group, the second DRX group may automatically exit a dormant state according to the DRX cycle and then enter a wake-up state, which is equivalent to waking up the second DRX group in advance.

One or more bits are configured to indicate a duration for the UE to wake up the second DRX group in advance. For example, in response to determining that the second DRX group is initially set to exit the dormant state and enter the wake-up state at a first time, and an advance duration indicated by one or more second bits in the wake-up notification is T, the second DRX group may be woken up at a target time earlier than the first time, which is T earlier than the first time.

One or more bits instruct the UE to immediately enter the wake-up time corresponding to the wake-up notification after the UE receives the wake-up notification.

In short, the wake-up notification transmitted from the UE may wake up the second DRX group in advance in various forms. The above contents are just a few examples, and a specific implementation is not limited to any one of the above contents.

Once the UE is configured with a DRX cycle, wake-up time of the UE may include at least one of the following:

within a timing time range of a timer related to a DRX function, timers related to the DRX function include, but are not limited to, a drx-on-duration timer, a drx-inactivity timer, a downlink (DL) drx-retransmission timer, an uplink (UL) drx-retransmission timer, or a ra-contention resolution timer. The timers related to the DRX function may also be called DRX timers. When a DRX timer runs, a corresponding DRX group is kept in a wake-up state. FIG. 3 shows a schematic diagram of a DRX cycle. On-duration 30 in the DRX cycle shown in FIG. 3 is timed by a wake-up timer as follows:

within time during which a scheduling request is transmitted on a physical uplink control channel (PUCCH) and the scheduling request is suspended;

within time during which downlink control information (DCI) transmitted on the PDCCH indicates that after successful response to a contention-free random access request, new transmission of a cell-radio network temporary identifier (C-RNTI) addressed to a media access control (MAC) entity is not started; it should be noted that this time is considered to be the activation time after the non-competitive random access based request has been successfully responded to and before the DCI indication of new data on the PDCCH of the C-RNTI addressed to the MAC entity has been received; a PDCCH indicating a new transmission addressed to the C-RNTI of the MAC entity has not been received after successful reception of a Random Access Response for the Random Access Preamble not selected by the MAC entity among the contention-based Random Access Preamble; and after the wake-up notification is received.

In an example, in response to determining that a scheduling request is transmitted on the PUCCH and the scheduling request is suspended, the UE may continue to keep the wake-up state until the scheduling request is responded to. For example, in response to determining that a resource scheduling indication transmitted based on the scheduling request is received, or that a rejection response to a rejection request transmitted based on the scheduling request is received, the suspended state of the scheduling request (SR) may be resolved, and the SR may trigger the UE to end the wake-up state. In another example, in response to determining that the DCI transmitted on the PDCCH indicates that if new transmission with the C-RNTI of the UE as an address is not started after successful response to contention-based random access, the UE may keep in the wake-up state until the new transmission succeeds, the wake-up time of the UE triggered by the random access request receiving successful response may be considered to be ended.

In the example of the disclosure, the wake-up notification may be transmitted on the PDCCH; that is, the wake-up notification may be carried in the DCI.

In a word, in the example of the disclosure, after receiving the wake-up notification for the second DRX group, the UE may enter the wake-up time corresponding to the wake-up notification. The wake-up time may be a time specially set for the wake-up notification to trigger the UE to enter the wake-up state.

In an example, a start time of the wake-up time corresponding to the wake-up notification may be the reception time when the UE receives the wake-up notification. An end time of the wake-up time corresponding to the wake-up notification may be any time or any time determined according to an instruction of the base station.

For example, the end time of the wake-up time corresponding to the wake-up notification may be the reception time when the UE receives a transmission instruction for data transmission transmitted from the base station after the wake-up notification, or a reception completion time when the UE receives service data transmitted after the wake-up notification. In response to determining that the transmission instruction for data transmission is taken as the end time of the wake-up time corresponding to the wake-up notification, the transmission instruction may further trigger the inactivity timer to run. After the UE receives the transmission instruction, the inactivity timer may run, and the wake-up state is kept in an operation process of the inactivity timer, such that the service data transmitted from the base station is received in the operation process of the inactivity timer. In another example, the base station may not transmit the transmission instruction of the service data after transmitting the wake-up notification, but may directly transmit the service data to the second DRX group of the UE in an idle resource. After receiving the service data, the UE may determine whether transmission of the service data of the base station is completed according to a transmission condition and/or decoding condition of the service data. In response to determining that the transmission is completed, it may be considered that the base station wakes up the second DRX group and completes transmission of the service data. For power consumption saving, the UE may consider that the wake-up time corresponding to the wake-up notification reaches the end time, such that the wake-up time corresponding to the wake-up notification is saved, and execution of the DRX function is continued according to DRX parameters including the DRX cycle.

The DRX parameters include timer information of various DRX timers, time information of wake-up time triggered by the SR, etc.

Thus, in an example, the wake-up notification is configured to instruct the second DRX group to enter the short DRX cycle from the long DRX cycle.

In response to determining that the wake-up notification is configured to instruct the second DRX group to switch from the long DRX cycle to the short DRX cycle, and then the second DRX group is woken up in advance, the second DRX group still switches between the wake-up state and the dormant state according to the DRX cycle, such that the dormant state and the wake-up state of the UE still follow the DRX cycle.

Thus, in another example, the wake-up notification is configured to disable the DRX function of the second DRX group.

In the example, the wake-up notification is temporarily equivalent to deactivating (disabling) the DRX function of the second DRX group. Deactivating the DRX function of the DRX group indicates that the DRX group continues or starts to perform PDCCH monitoring for a timer duration.

In another example, after a period of time, the base station may re-enable the DRX function of the second DRX group by wake-up notification.

In another example, the duration of disabling the DRX function of the second DRX group is further introduced into the wake-up notification. In response to determining that an actual duration of disabling the second DRX group reaches the duration, the second DRX group may re-enable the DRX function, and after the DRX function is re-enabled, switch between the dormant state and the wake-up state may be conducted according to the DRX cycle.

In an example, DRX parameters of the second DRX cycle are involved, where the DRX parameters may include at least a DRX cycle, and the DRX cycle further includes: a long DRX cycle and a short DRX cycle. In response to determining that the second DRX group is configured with only one DRX cycle, the second DRX group with a re-enabled DRX function may re-run according to the unique DRX cycle configured. In response to determining that the second DRX cycle is configured with both a long DRX cycle and a short DRX cycle, a DRX cycle may be selected for operation according to an operation strategy. For example, deactivating the currently used DRX cycle according to the DRX function according to the operating policy according to the operation strategy; and alternatively, a data transmission requirement of a current second DRX cycle is determined according to the operation strategy, in response to determining that a data transmission frequency is higher than a preset frequency, operation is conducted according to the short DRX cycle, and otherwise, for power consumption saving, operation is performed according to the long DRX cycle.

In an example, the wake-up notification is configured to control the second DRX group to enter the wake-up time corresponding to the wake-up notification.

In this way, the second DRX group is woken up in advance, instead of using the inactivity timer to trigger the second DRX group to be woken up, or disabling the DRX function or shortening the DRX cycle to wake up the second DRX group. Another wake-up time parallel to the wake-up time corresponding to the inactivity timer is specially configured for the wake-up notification, such that the second DRX group of the UE may also be woken up in advance. Specifically, during another wake-up time parallel to the wake-up time during which the UE exits DRX and enters an activated state after the SR is transmitted and during which the UE exits the DRX and enters the activated state after receiving the contention-free random access request (RAR) as specified in a wake-up mechanism and an existing MAC protocol, that is, when a user wakes up the second DRX group in advance in this way, the UE exits the DRX and enters the wake-up state (or becomes the activated state) for the second DRX group, which means waiting for subsequent scheduling of a network.

In some examples, the wake-up notification is carried in radio resource control (RRC) signaling, a medium access control control element (MAC CE), or downlink control information (DCI).

In the example of the disclosure, a transmission mode of the wake-up notification may be flexibly set, and the wake-up notification may be transmitted by using high-level signaling or physical-layer signaling.

The transmission mode through the high-level signaling is flexible, and the transmission mode through the physical-layer signaling is high in transmission efficiency.

Granularity of the wake-up notification may be UE granularity or UE group granularity.

For example, the wake-up notification may be transmitted in a unicast mode for the UE with a specific function. For example, the wake-up notification may be transmitted in a multicast mode for a UE group that implements a specific function. Taking the reporting of water consumption or electricity consumption by an intelligent water meter and an intelligent electric meter as an example, the wake-up notification can be multicast because of the functional similarity of these types of devices.

In some examples, as shown in FIG. 4, the method further includes step S100.

In step S100, auxiliary information of the UE is received. S110 may include:

the wake-up notification is transmitted to the first DRX group in the wake-up state in the UE according to the auxiliary information.

Through the auxiliary information, the base station may select a currently suitable mode to wake up the second DRX group in advance according to the urgency for the second DRX group in the UE to enter the wake-up state currently, and then transmit the wake-up notification accordingly.

For example, the second DRX group runs currently according to the short DRX cycle. In response to determining that there is a need to wake up the second DRX group in advance, obviously, a mode of switching from the long DRX cycle to the short DRX cycle cannot be used, and it may be necessary to configure the inactivity timer that starts before an original wake-up time of the second DRX group, or to disable the DRX function, such that the second DRX group may be woken up in advance.

In response to determining that a mode of disabling the DRX function is used, the premise of waking up the second DRX group in advance is that the second DRX group supports disabling the DRX function.

For another example, in response to determining that the second DRX group is configured with a group of a long DRX cycle and a short DRX cycle currently, and operation is conducted currently according to the long DRX cycle, the wake-up notification may instruct that the UE wakes up the second DRX group of the UE in advance by switching from running according to the long DRX cycle to running according to the short DRX cycle.

In an example, the auxiliary information includes at least one of the following:

timer information of the inactivity timer of the second DRX group;

cycle information of the short DRX cycle of the second DRX group;

whether disabling the DRX function of the second DRX group is supported; or suggestion information on whether the second DRX group needs to enter the wake-up state.

The timer information may at least include: timing duration of the inactivity timer, and/or an original trigger event for starting or restarting the inactivity timer.

The cycle information may include: entire cycle duration of a short DRX cycle, and duration of off-duration and/or on-duration in a cycle.

For example, according to its own buffer size report (BSR), the UE may report the suggestion information on whether the UE needs to enter the wake-up state in advance through the auxiliary information.

Figures 5, 6:
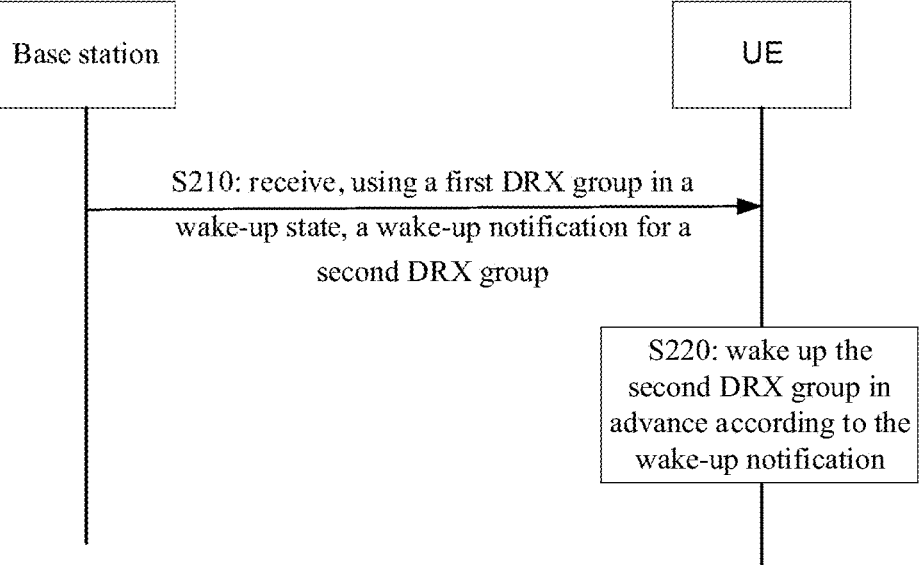
FIG. 5 is a schematic flow diagram of a method for wake-up for the DRX according to an example.
FIG. 6 is a schematic structural diagram of an apparatus for wake-up for the DRX according to an example.

As shown in FIG. 5, an example of the disclosure further provides a method for wake-up for DRX. The method includes the following steps: S210 and S220.

In step S210, a wake-up notification for a second DRX group is received using a first DRX group in a wake-up state.

In step S220, the second DRX group is woken up in advance according to the wake-up notification.

The method for wake-up for DRX provided in the example of the disclosure may be applied to a UE configured with a plurality of DRX groups.

The UE configured with the plurality of DRX groups may be a multi-antenna UE or a UE with multi-radio frequency (RF) receivers.

In the example of the disclosure, the first DRX group of the UE may receive the wake-up notification for the second DRX group, and the wake-up notification may wake up the second DRX group in advance for more timely data transmission on the second DRX group.

After receiving the wake-up notification for the second DRX group by using the first DRX group, the UE may wake up the second DRX group in advance before a wake-up time corresponding to a DRX cycle in which the second DRX group currently runs, such that the second DRX group exits a dormant state and enters the wake-up state for timely data transmission by using the second DRX group.

In some examples, there are a plurality of implementation forms of S210, which may specifically be any one of the following:

a first mode is to wake up the second DRX group in advance by starting or restarting an IAT of the second DRX group.

A second mode is to wake up the second DRX group in advance by exiting a long DRX cycle of a DRX group and entering a short DRX cycle.

A third mode is to disable a DRX function of the second DRX group according to the wake-up notification.

A fourth mode is to control the second DRX group to enter the wake-up time corresponding to the wake-up notification according to the wake-up notification.

For example, the inactivity timer of the second DRX group is started for the first time or restarted, and the second DRX group of the UE is kept in the wake-up state within a timing time range of the inactivity timer.

For example, the UE may determine a wake-up mode in advance by itself according to a current dormant state of the second DRX group, or may directly determine a wake-up mode according to an instruction of the wake-up notification.

In response to determining that a base station determines the wake-up mode, the UE may report DRX parameters and/or DRX capability information of the second DRX group to the base station, such that the base station may determine the wake-up mode accordingly.

In a word, the UE and the base station select the wake-up mode supported by the second DRX group of the UE and suitable for a current service transmission requirement and/or power consumption of the UE.

In some examples, the wake-up notification is carried in radio resource control (RRC) signaling, a medium access control control element (MAC CE), or downlink control information (DCI).

There are various transmission modes of the wake-up notification, and there are also various signaling carrying the wake-up notification. Specifically, any one of the RRC signaling, the MAC CE, and the DCI may be used to transmit the wake-up notification.

In some implementations, the method further includes:

auxiliary information is reported, where the wake-up notification is determined according to the auxiliary information.

In an example, the wake-up mode corresponding to the wake-up notification may be determined according to the auxiliary information.

In another example, specific contents carried in the wake-up notification may be determined according to the auxiliary information.

In an example, the auxiliary information includes at least one of the following:

timer information of the inactivity timer of the second DRX group;
   cycle information of the short DRX cycle of the second DRX group;
   whether disabling the DRX function of the second DRX group is supported; or
   suggestion information on whether the second DRX group needs to enter the wake-up state.

In order to satisfy requirements for increase in single-user peak rate and system capacity, carrier aggregation (CA) has been introduced into R10 of LTE. It may be divided into continuous carrier aggregation and discontinuous carrier aggregation. For continuous carrier aggregation, the UE merely needs a transceiver, and for different bands of discontinuous carrier aggregation, different radio frequency transceivers (or RF chains) are needed. Thus, it is extremely likely that a primary cell (PCell) and a secondary cell (SCell) use different RF chains; accordingly, the RF chains used by the primary cell (PCell) and the secondary cell (SCell) may be switched on or off separately, and the primary cell (PCell) and the secondary cell (SCell) may be set to different DRX groups. Thus, the above mechanism is different from an original common DRX mechanism; that is, a new auxiliary DRX group for the SCell is introduced. Under the condition that there are two groups, for a scheduling behavior of a group in some scenarios, the other group probably needs to be woken up. For example, in response to determining that a channel status information (CSI) reporting resource is merely configured in a group of frequency range 1 (FR1), and the group of the FR1 enters an off state, CSI on FR2 cannot be reported on the FR1. Thus, the base station may wake up the other group for scheduling. Alternatively, a network knows from a report of a buffer size report (BSR) that there is data to be transmitted in a logical channel of the other group (in this case, the group has already entered a dormant state). In this case, the network may start the other group in advance before the on-duration of the group.

As shown in FIG. 6, an example of the disclosure provides an apparatus for wake-up for DRX. The apparatus includes:

a first transmission module 510 configured to transmit a wake-up notification to a first DRX group in a wake-up state in the UE, where the wake-up notification is at least configured to wake up a second DRX group in a dormant state in the UE in advance.

In an example, the first transmission module 510 may be a program module. After the program module is executed by a processor, the wake-up notification may be transmitted, and the wake-up notification may be any notification for explicitly or implicitly instructing the second DRX group in the UE to exit the dormant state and enter the wake-up state.

In another example, the first transmission module 510 may be a hardware-software combination module. The hardware-software combination module includes, but is not limited to, various programmable arrays. The programmable arrays include, but are not limited to, a complex programmable array or a field programmable gate array.

In another example, the first transmission module 510 may be a pure hardware module. The pure hardware module includes, but is not limited to, an application-specific integrated circuit.

In an example, the wake-up notification is configured to instruct an inactivity timer (IAT) of the second DRX group to start or restart.

Within a timing range of the inactivity timer (that is, when the IAT is running), the second DRX group is kept in the wake-up state.

In an example, the wake-up notification is configured to instruct the second DRX group to enter a short DRX cycle from a long DRX cycle.

In an example, the wake-up notification is configured to disable a DRX function of the second DRX group.

In an example, the wake-up notification is configured to control the second DRX group to enter the wake-up time corresponding to the wake-up notification.

In an example, the wake-up notification is carried in radio resource control (RRC) signaling, a medium access control control element (MAC CE), or downlink control information (DCI).

In an example, the apparatus further includes:

a first reception module configured to receive auxiliary information of the UE.

The first transmission module 510 is configured to transmit the wake-up notification to the first DRX group in the wake-up state in the UE according to the auxiliary information.

In an example, the auxiliary information includes at least one of the following:

timer information of the inactivity timer of the second DRX group;
   cycle information of the short DRX cycle of the second DRX group;
   whether disabling the DRX function of the second DRX group is supported; or
   suggestion information on whether the second DRX group needs to enter the wake-up state.

Figure 7:
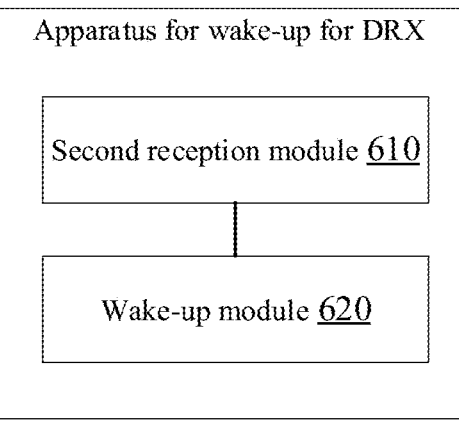
FIG. 7 is a schematic structural diagram of an apparatus for wake-up for the DRX according to an example.

As shown in FIG. 7, an example of the disclosure provides an apparatus for wake-up for DRX. The apparatus includes:

a second reception module 610 configured to receive, using a first DRX group in a wake-up state, a wake-up notification for a second DRX group; and a wake-up module 620 configured to wake up the second DRX group in advance according to the wake-up notification.

In an example, the second reception module 610 and the wake-up module 620 may be program modules. After being executed by a processor, the program modules may receive the wake-up notification by using the first DRX group and wake up the second DRX group in advance according to the received wake-up notification.

In another example, the second reception module 610 and the wake-up module 620 may be hardware-software combination modules. The hardware-software combination modules include, but are not limited to, various programmable arrays. The programmable arrays include, but are not limited to, a complex programmable array or a field programmable gate array.

In another example, the second reception module 610 and the wake-up module 620 may be pure hardware modules. The pure hardware modules include, but are not limited to, an application-specific integrated circuit.

In an example, the wake-up module 620 is configured to wake up the second DRX group in advance by starting or restarting an IAT of the second DRX group.

In an example, the wake-up module 620 is configured to wake up the second DRX group in advance by exiting a long DRX cycle of a DRX group and entering a short DRX cycle.

In an example, the wake-up module 620 is configured to disable a DRX function of the second DRX group according to the wake-up notification.

In another example, the wake-up module 620 is configured to enable the second DRX group to enter the wake-up time corresponding to the wake-up notification according to the wake-up notification.

In an example, the wake-up notification is carried in radio resource control (RRC) signaling, a medium access control control element (MAC CE), or downlink control information (DCI).

In an example, the apparatus further includes:

a reporting module configured to report auxiliary information, where the wake-up notification is determined according to the auxiliary information.

In an example, the auxiliary information includes at least one of the following:

timer information of an inactivity timer of the second DRX group;

cycle information of the short DRX cycle of the second DRX group;

whether disabling the DRX function of the second DRX group is supported; or suggestion information on whether the second DRX group needs to enter the wake-up state.

A base station explicitly notifies the UE to wake up a DRX group in a dormant state in advance.

For example, the base station explicitly indicates that the inactivity timer (IAT) of another group is started or restarted.

In a mode, the base station explicitly indicates that another group is started or restarted after entering a short cycle. The short cycle is short for the short DRX cycle. Timing of the short cycle is achieved by a drx-short cycle timer. This means that on-duration in the short cycle may be started at a qualified time point. For example, a network knows from a BSR that a large amount of data is coming from a logical channel group of another group, that is, another carrier may enter a more intensive short-cycle transmission mode.

In another mode, the DRX function of another group may be disabled, which is always in a monitoring mode. In this way, a DRX function of a DRX group is deactivated, the wake-up state is kept, and a PDCCH is monitored.

For transmission of a current notification, the base station may use the RRC signaling, the MAC control element, or a DCI message to notify the UE of the wake-up of another group.

In an example, the UE provides the auxiliary information to the base station, which is used as a reference for the base station to explicitly notify the UE to wake up a DRX group in a dormant state. In this way, the base station may determine which way to wake up the DRX group in the dormant state in the UE in advance according to the auxiliary information.

In an example, the UE asks the network to instruct an IAT of another group to start or restart.

In an example, the UE asks the network to instruct another group to enter the short cycle, that is, to start or restart the drx-short cycle timer.

In an example, the UE asks the network to instruct that the DRX function of another group may be disabled. An example of the disclosure provides a communication device. The communication device includes a processor, a transceiver, a memory, and an executable program that is stored in the memory and is runnable by the processor, where the processor performs the method for wake-up for DRX provided in any one of the above-mentioned technical solutions when running the executable program.

The memory may include various types of storage media, which are non-transitory computer storage media, and may continue to store information stored in the communication device after the communication device is powered off. The communication device includes a base station or a user device.

The processor may be connected to the memory by using a bus, etc. Furthermore, the processor is configured to read an executable program stored in the memory, such as at least one of the methods shown in FIGS. 2, 4, and 5.

An example of the disclosure provides a non-transitory computer storage medium. The non-transitory computer storage medium stores an executable program, where the executable program, when executed by a processor of a communication device, causes the communication device to perform the method shown in any one of the technical solutions of the first aspect or the second aspect, such as at least one of the methods shown in FIG. 2 and FIGS. 4-5.

Figure 8:
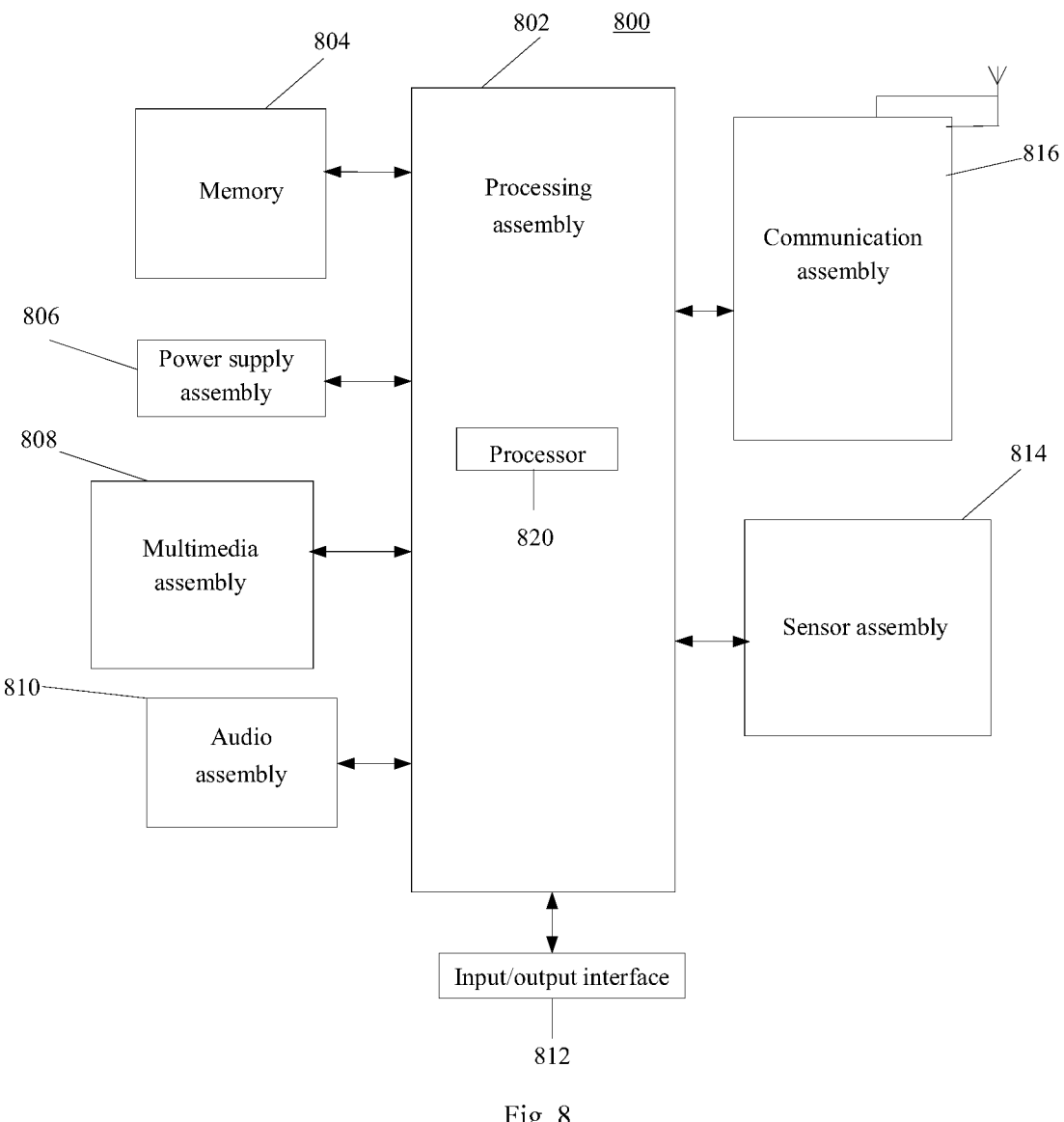
FIG. 8 is a schematic structural diagram of a user equipment (UE) according to an example.

FIG. 8 is a block diagram of UE 800 according to an example. For example, the UE 800 may be a mobile phone, a computer, a digital broadcast user device, a messaging device, a game console, a tablet device, a medical device, a fitness device, a personal digital assistant, etc.

With reference to FIG. 8, the UE 800 may include one or more of the following assemblies: a processing assembly 802, a memory 804, a power supply assembly 806, a multimedia assembly 808, an audio assembly 810, an input/output (I/O) interface 812, a sensor assembly 814, and a communication assembly 816.

The processing assembly 802 generally controls all operations of the UE 800, such as operations associated with display, telephone call, data communication, camera operation, and recording operations. The processing assembly 802 may include one or more processors 820 for executing an instruction, so as to complete all or some steps of the method. In addition, the processing assembly 802 may include one or more modules to facilitate interactions between the processing assembly 802 and other assemblies. For example, the processing assembly 802 may include a multimedia module to facilitate an interaction between the multimedia assembly 808 and the processing assembly 802.

The memory 804 is configured to store various types of data to support operations on the UE 800. Examples of the data include an instruction for any application or method operating on the UE 800, contact data, phone book data, a message, a picture, a video, etc. The memory 804 may be implemented through any type or combination of volatile or non-volatile memory devices, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power supply assembly 806 supplies power to various assemblies of the UE 800. The power supply assembly 806 may include a power management system, one or more power supplies, and other assemblies associated with generating, managing, and distributing power for the UE 800.

The multimedia assembly 808 includes a screen that provides an output interface between the UE 800 and a user. In some examples, the screen may include a liquid crystal display (LCD) and a touch panel (TP). If the screen includes the touch panel, the screen may be implemented as a touch screen to receive an input signal from the user. The touch panel includes one or more touch sensors to sense touch, slide, and gestures on the touch panel. The touch sensor may sense a boundary of a touch or slide operation, and detect duration and pressure related to the touch or slide operation. In some examples, the multimedia assembly 808 includes a front-facing camera and/or a rear-facing camera. When the UE 800 is in an operation mode, such as a shooting mode or a video mode, the front-facing camera and/or the rear-facing camera may receive external multimedia data. Each of the front-facing camera and the rear-facing camera may be a fixed optical lens system or have a focal length and optical zoom capability.

The audio assembly 810 is configured to output and/or input an audio signal. For example, the audio assembly 810 includes a microphone (MIC). The microphone is configured to receive an external audio signal when the UE 800 is in operation modes such as a call mode, a recording mode, and a voice identification mode. The received audio signal may be further stored in the memory 804 or transmitted via the communication assembly 816. In some examples, the audio assembly 810 further includes a speaker for outputting an audio signal.

The I/O interface 812 provides an interface between the processing assembly 802 and a peripheral interface module. The peripheral interface module may be a keyboard, a click wheel, a button, etc. The buttons may include, but are not limited to, a home button, a volume button, a start button, and a lock button.

The sensor assembly 814 includes one or more sensors for providing various aspects of state assessment for the UE 800. For example, the sensor assembly 814 may detect an on/off state of the UE 800 and relative positioning of the assemblies, such as a display and a keypad of the UE 800, and the sensor assembly 814 may further detect position change of the UE 800 or an assembly of the UE 800, presence or absence of contact between the user and the UE 800, an orientation or acceleration/deceleration of the UE 800, and temperature change of the UE 800. The sensor assembly 814 may include a proximity sensor configured to detect the presence of a nearby object without any physical contact. The sensor assembly 814 may further include an optical sensor, such as a complementary metal-oxide-semiconductor (CMOS) or charge-coupled device (CCD) image sensor, which is used in imaging applications. In some examples, the sensor assembly 814 may further include an acceleration sensor, a gyroscope sensor, a magnetic sensor, a pressure sensor, or a temperature sensor.

The communication assembly 816 is configured to facilitate wired or wireless communication between the UE 800 and other devices. The UE 800 may access a wireless network based on a communication standard, such as WiFi, the 2nd generation mobile communication technology (2G), the 3rd generation mobile communication technology (3G), or their combination. In an example, the communication assembly 816 receives a broadcast signal or broadcast-related information from an external broadcast management system via a broadcast channel. In an example, the communication assembly 816 further includes a near field communication (NFC) module to facilitate short-range communication. For example, the NFC module may be implemented based on a radio frequency identification (RFID) technology, an infrared data association (IrDA) technology, an ultra-wideband (UWB) technology, a Bluetooth (BT) technology, etc.

In an example, the UE 800 may be implemented by one or more of an application specific integrated circuit (ASIC), a digital signal processor (DSP), a digital signal processing device (DSPD), a programmable logic device (PLD), a field programmable gate array (FPGA), a controller, a microcontroller, a microprocessor, or other electronic components, thus executing the method.

In an example, there is further provided a non-transitory computer-readable storage medium including an instruction, such as the memory 804, including an instruction. The instruction may be executed by the processor 820 of the UE 800 so as to complete the method. For example, the non-transitory computer-readable storage medium may be a ROM, a random access memory (RAM), a compact disk (CD)-ROM, a magnetic tape, a floppy disk, an optical data storage device, etc.

Figure 9:
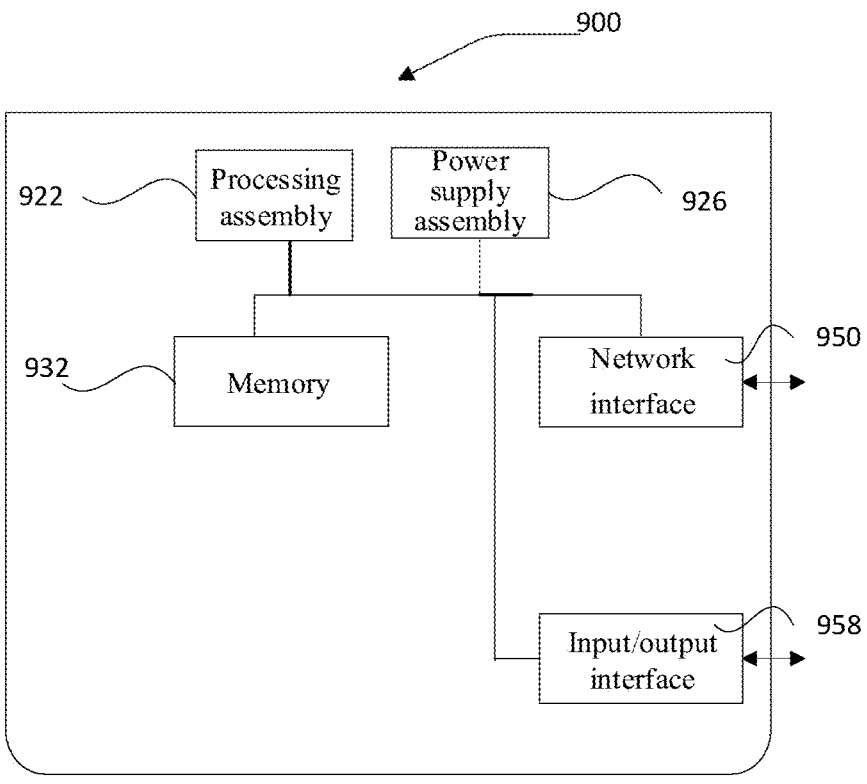
FIG. 9 is a schematic structural diagram of a base station according to an example.

As shown in FIG. 9, an example of the disclosure shows a structure of a base station. For example, a network-side device may be used as the base station 900. With reference to FIG. 9, the base station 900 includes a processing assembly 922, which further includes one or more processors, and a memory resource represented by a memory 932, which is configured to store instructions executable by the processing assembly 922, such as applications. The applications stored in the memory 932 may include one or more modules, and each module corresponds to a group of instructions. In addition, the processing assembly 922 is configured to execute instructions, so as to perform any one of the methods applied to the base station, such as the method shown in FIGS. 2, 4, and 5.

The base station 900 may further include a power supply assembly 926 configured to execute power management of the base station 900, a wired or wireless network interface 950 configured to connect the base station 900 to a network, and an input/output (I/O) interface 958. The base station 900 may operate based on an operating system stored in the memory 932, such as Windows Server™, Mac OS X™, Unix™, Linux™, FreeBSD™, etc.

Those skilled in the art could easily conceive of other implementation solutions of the disclosure upon consideration of the description and practice of the disclosure here.

The disclosure is intended to cover any variations, uses, or adaptive changes of the disclosure. Furthermore, these variations, uses, or adaptive changes follow the general principles of the disclosure and include common general knowledge or conventional technical means that are not disclosed in the art. The description and the examples are to be regarded as merely illustrative, and the true scope and spirit of the disclosure are indicated by the following claims.

It is to be understood that the disclosure is not limited to a precise structure which is described above and illustrated in the accompanying drawings, and can be modified or changed in various ways without departing from the scope. The scope of the disclosure is limited merely by the appended claims.

What is claimed is:

1. A method for wake-up for discontinuous reception (DRX), performed by a base station, the method comprising:

transmitting a wake-up notification to a first DRX group in a wake-up state in a user equipment (UE), wherein the wake-up notification is at least configured to wake up a second DRX group in a dormant state in the UE in advance and carry a group identifier of the second DRX group, and the wake-up notification is transmitted from the base station on a time-frequency resource scheduled for the first DRX group;

wherein the wake-up notification is configured to at least one of:

instruct an inactivity timer (IAT) of the second DRX group to start or restart;

instruct the second DRX group to enter a short DRX cycle from a long DRX cycle;

disable a DRX function of the second DRX group; or control the second DRX group to enter a wake-up time corresponding to the wake-up notification;

wherein transmitting the wake-up notification to the first DRX group in the wake-up state in the UE comprises:

multicasting the wake-up notification to the first DRX group in the wake-up state in the UE, wherein the multicast of the wake-up notification is for a UE group.

2. The method according to claim 1, wherein the wake-up notification is carried in radio resource control (RRC) signaling, a medium access control control element (MAC CE), or downlink control information (DCI).

3. The method according to claim 1, further comprising:

receiving auxiliary information of the UE, wherein transmitting the wake-up notification to the first DRX group in the wake-up state in the UE comprises:

transmitting the wake-up notification to the first DRX group in the wake-up state in the UE according to the auxiliary information.

4. The method according to claim 3, wherein the auxiliary information comprises at least one of:

timer information of an inactivity timer of the second DRX group;

cycle information of a short DRX cycle of the second DRX group;

whether disabling a DRX function of the second DRX group is supported; or suggestion information on whether the second DRX group needs to enter the wake-up state.

5. The method according to claim 1, wherein transmitting the wake-up notification to the first DRX group in the wake-up state in the UE comprises:

transmitting the wake-up notification to the first DRX group in the wake-up state in the UE, in response to determining that cache data volume for the UE is greater than a cache threshold.

6. The method according to claim 1, wherein the wake-up notification further comprises a group identifier of a DRX group that receives the wake-up notification.

7. The method according to claim 1, wherein a start time of the wake-up time corresponding to the wake-up notification comprises a reception time when the UE receives the wake-up notification, and an end time of the wake-up time corresponding to the wake-up notification comprises:

a reception time when the UE receives a transmission instruction for data transmission; or a time when the UE completes the reception of service data, wherein the transmission instruction or the service data is transmitted from the base station after the wake-up notification.

8. The method according to claim 1, wherein disabling the DRX function of the DRX group indicates that the DRX group continues or starts to perform PDCCH monitoring for a timer duration.

9. The method according to claim 1, wherein the wake-up notification is further configured to indicate a duration of disabling the DRX function of the second DRX group, and the DRX function of the second DRX group is re-enabled in response to determining that an actual duration of disabling the second DRX group reaches the duration.

10. The method according to claim 1, wherein the first DRX group is a DRX group of a primary cell, and the second DRX group is a DRX group of a secondary cell; or the second DRX group is the DRX group of the primary cell, and the first DRX group is the DRX group of the secondary cell.

11. A method for wake-up for discontinuous reception (DRX), performed by a user equipment (UE), the method comprising:

receiving, using a first DRX group in a wake-up state, a wake-up notification for a second DRX group; and waking up the second DRX group in advance according to the wake-up notification;

wherein waking up the second DRX group in advance according to the wake-up notification comprises at least one of:

waking up the second DRX group in advance by starting or restarting an IAT of the second DRX group;

waking up the second DRX group in advance by exiting a long DRX cycle of a DRX group and entering a short DRX cycle;

disabling a DRX function of the second DRX group according to the wake-up notification; or enabling the second DRX group to enter a wake-up time corresponding to the wake-up notification according to the wake-up notification;

wherein the wake-up notification is transmitted from a base station on a time-frequency resource scheduled for the first DRX group and is configured to carry a group identifier of the second DRX group; and the wake-up notification is multicast to the first DRX group, and the multicast of the wake-up notification is for a UE group.

12. The method according to claim 11, wherein the wake-up notification is carried in radio resource control (RRC) signaling, a medium access control control element (MAC CE), or downlink control information (DCI).

13. The method according to claim 11, further comprising:

reporting auxiliary information, wherein the wake-up notification is determined according to the auxiliary information.

14. The method according to claim 13, wherein the auxiliary information comprises at least one of:

timer information of an inactivity timer of the second DRX group;

cycle information of a short DRX cycle of the second DRX group;

whether disabling a DRX function of the second DRX group is supported; and suggestion information on whether the second DRX group needs to enter the wake-up state.

15. A communication device, comprising:

a transceiver, a memory that stores an executable program, one or more processors that are communicatively coupled to the transceiver and the memory, wherein the one or more processors are collectively configured to:

transmit a wake-up notification to a first discontinuous reception (DRX) group in a wake-up state in a user equipment (UE), wherein the wake-up notification is at least configured to wake up a second DRX group in a dormant state in the UE in advance and carry a group identifier of the second DRX group, and the wake-up notification is transmitted from the base station on a time-frequency resource scheduled for the first DRX group;

wherein the wake-up notification is configured to at least one of:

instruct an inactivity timer (IAT) of the second DRX group to start or restart;

instruct the second DRX group to enter a short DRX cycle from a long DRX cycle;

disable a DRX function of the second DRX group; or control the second DRX group to enter a wake-up time corresponding to the wake-up notification;

wherein the one or more processors are further collectively configured to:

multicast the wake-up notification to the first DRX group in the wake-up state in the UE, wherein the multicast of the wake-up notification is for a UE group.

16. A non-transitory computer storage medium storing an executable program, wherein the executable program, when executed by a processor of a communication device, causes the communication device to perform the method according to claim 1.

17. A communication device, comprising:

a transceiver, a memory that stores an executable program, one or more processors that are communicatively coupled to the transceiver and the memory, wherein the executable program, when collectively executed by the one or more processors, causes the communication device to perform the method according to claim 11.

18. A non-transitory computer storage medium storing an executable program, wherein the executable program, when executed by a processor of a communication device, causes the communication device to perform the method according to claim 11.

* * * * *